(12) United States Patent
Campbell et al.

(10) Patent No.: US 7,224,185 B2
(45) Date of Patent: May 29, 2007

(54) SYSTEM OF FINITE STATE MACHINES

(76) Inventors: John Campbell, 3750 W. 1975 North, Plain City, UT (US) 84404; Gardiner S. Stiles, 545 Sego Lily La., Providence, UT (US) 84332

( * ) Notice: Subject to any disclaimer, the term of this patent is extended or adjusted under 35 U.S.C. 154(b) by 297 days.

(21) Appl. No.: 10/523,485

(22) PCT Filed: Aug. 5, 2003

(86) PCT No.: PCT/US03/24451

§ 371 (c)(1),
(2), (4) Date: Feb. 4, 2005

(87) PCT Pub. No.: WO2004/014065

PCT Pub. Date: Feb. 12, 2004

(65) Prior Publication Data

US 2006/0036413 A1   Feb. 16, 2006

(51) Int. Cl.
*H03K 19/173*   (2006.01)
*G06F 15/16*   (2006.01)
*G06F 17/10*   (2006.01)

(52) U.S. Cl. .................. 326/46; 703/2; 703/4; 703/14; 709/246

(58) Field of Classification Search ............... 326/46, 326/93
See application file for complete search history.

(56) References Cited

U.S. PATENT DOCUMENTS

| 5,550,760 | A | 8/1996 | Razdan et al. |
| 5,847,578 | A | 12/1998 | Noakes et al. |
| 6,134,516 | A * | 10/2000 | Wang et al. .................. 703/27 |
| 6,356,863 | B1 | 3/2002 | Sayle |
| 2002/0161907 | A1 * | 10/2002 | Moon .......................... 709/230 |

* cited by examiner

*Primary Examiner*—Vibol Tan
(74) *Attorney, Agent, or Firm*—Fehr Law Firm; Thompson E. Fehr (57) ABSTRACT

A system of finite state machines built with asynchronous or synchronous logic for controlling the flow of data through computational logic circuits programmed to accomplish a task specified by a user, having one finite state machine associated with each computational logic circuit, having each finite state machine accept data from either one or more predecessor finite state machines or from one or more sources outside the system and furnish data to one or more successor finite state machines or a recipient outside the system, excluding from consideration in determining a clock period for the system logic paths performing the task specified by the user, and providing a means for ensuring that each finite state machine allows sufficient time to elapse for the computational logic circuit associated with that finite state to perform its task.

5 Claims, 4 Drawing Sheets

Figure 1

```
            Goto AfterTag
   Self:
            Goto Self
            Tag ID Byte
            *  ⎤
            *  ⎬  Tag Specific
            *  ⎦  Information
   AfterTag:
```

SYSTEM OF FINITE STATE MACHINES

TECHNICAL FIELD

This paper reports on the design of the Trebuchet, a pseudo-asynchronous micropipeline. It grows out of an earlier effort we called SMAL [4]. SMAL was a system, which, like the Trebuchet, was compiled from Java to hardware. The execution engine was basically a massive synchronously clocked pipeline network that became unwieldy with any but the smallest pieces of software.

Figure 1:
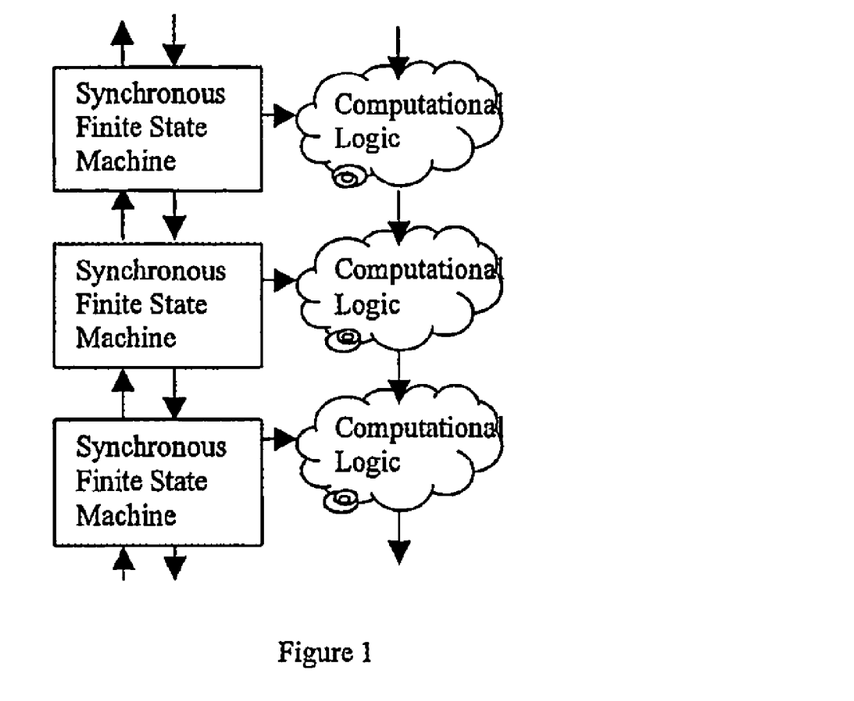

The Trebuchet, in contrast, targets a linear pipeline composed of many interacting state machines. (See FIG. 1.) Each state machine, while entirely synchronous, behaves asynchronously in the sense that stage latency depends on the complexity of the computation performed rather than on the clock period. The clock period, rather than being dependent on the longest logic chain, is set by the time required to exchange handshaking signals with immediate neighbors.

On the global scale, the Trebuchet resembles Sutherland's asynchronous micropipelines [27], inheriting many of its behavioral characteristics, despite being completely synchronous in the details. Hence we describe the Trebuchet as Pseudo-Asynchronous. We claim that pseudo-asynchronism allows the flexibility required to implement software as a cohesive hardware machine, and that the benefits normally ascribed to asynchronous machinery may be achievable [6]. Specifically, like conventional asynchronous circuitry, throughput should depend on the average stage latency rather than the longest logic chain. Likewise, current draw should be smoothed with attendant reductions in radiated EMI.

The thrust of our research has been to develop a methodology for seamless implementation of hardware and software functionality. It has applications in both the fields of embedded systems and reconfigurable computing engines. The first is concerned with dividing functionality between software and hardware (generally application specific integrated circuits (ASICs)) whereas the latter seeks to off-load time-critical functions to temporary circuits configured into field programmable gate arrays (FPGAs).

In contrast to conventional projects where software is prepared in an environment of existing and stable hardware, embedded computer systems typically require parallel development of hardware and software components. Because the respective disciplines of hardware and software development are commonly conceived of as quite different, early decisions about task allocation are made which have profound and irreversible consequences on the ultimate cost and performance of the system. Consequently, much of the research in embedded system technology is devoted to blending the development methodologies by deriving both hardware and software from high-level descriptions so that decisions can be delayed as long as possible and are demonstrably correct when made [1].

Because conventional hardware design is tedious and foreign to most software practitioners, generating hardware from software has been an important research goal [22]. Generally speaking, these approaches target reconfigurable machinery hosted on FPGAs. However, reconfigurable co-processors tend to execute their functions rapidly and then remain idle for long periods of time. Consequently, the question of how to dynamically reconfigure the co-processor has also become important [8][16][28].

Our overall goal has been to develop a methodology in which the use of CPUs, reconfigurable logic implemented in FPGAs, and permanently configured logic in an ASIC (application specific integrated circuit) are all parameters in a scheduling problem [4]. But because available chip real estate allows implementation of only small portions of a program in hardware, it seems desirable to develop an approach that deals with multiple chips and the consequences of chip and board boundaries.

We seek a methodology that automatically allocates portions of a program to a network of execution resources based on single-threaded software execution profiles. A methodology that constructs systems using both hardware and software can take best advantage of the available execution resources. Code written in a high level language (e.g., Java) may execute as machine instructions or directly as hardware. The decision should depend on the needs of the work to be done and the resources available to do it.

We chose Java as the application language because the Java Virtual Machine (JVM) has a simple and regular addressing scheme without registers, and because the interpreter makes it easy to gather execution statistics that may be used in mapping experiments. Ours and other research at our institution indicated that Java execution is predictable enough that transformation of portions of an application to hardware is possible [24]. Fleischmann and Buchenrieder are also using Java to study reconfigurable hardware systems, but do not generate hardware automatically, as our system does [8]. Hutchings et al. are doing low level hardware design with Java-based JHDL [15], but their tool is not aimed at high performance pipeline systems.

This invention relates to organization and structure of computing machinery residing in a FPGA or ASIC device. Application programs are typically compiled from source code into a stream of instructions that control successive actions by a CPU (Central Processing Unit). However high performance machinery can be directly constructed to perform the intended computation without recourse to a CPU. This is typically done in signal processing and other applications with large throughput requirements and significant low-level parallelism.

BACKGROUND ART

There are three main bodies of work that bear on this problem. Task partitioning has been traditionally applied to large scale multiprocessing, but the issues are the same: how to parcel out work to computational resources. Systolic processing is a technique for overlapping computations at a fine granularity. Reconfigurable computing aims to off-load processing to temporarily configured hardware.

Systolic Processing

Systolic processing arrays are characterized by regular arrays of processors fixed in place with data streaming through them. Considerable speed can be achieved due to the high degree of pipeline-ability. Most, though not all, systolic processing is performed on digital signal processing (DSP) applications.

Kung proposed this mode of computing in [19] as a straight-forward mapping of signal flow graphs onto hardware. By performing several operations on a data item before returning it to memory, throughput of compute bound programs could be greatly increased. Kung provided a semi-automatic method of transforming a data flow graph into a systolic array configuration. He noted that memory bandwidth is likely to remain a bottleneck even after systolization. Systolic arrays as conceived by Kung were dedicated hardware devices.

Systolic processing has grown with the work of many researchers. Johnson, et al. [18] surveyed the state of the art in 1993. They found that most of the work had shifted away from dedicated processors toward reconfigurable hardware. Programming was typically done by schematic entry or in hardware oriented languages such as VHDL, and most implementations relied on Field Programmable Gate Arrays (FPGAs). They identified the low pin-out of FPGAs as a major limiting factor: the bottleneck in processing rate was communication with the FPGA. They noted that technology limited designs to static configurations and identified automatic array synthesis as an important area to pursue. Since publication of Johnson's survey, both of these have bean actively researched (see [1] and [18])

Reconfigurable Computing

Research on configurable computing engines is hampered by the inability to compare results. In a recent article discussing the needs of the community, a committee stated that it is difficult to decide whether differences in performance reported by investigators are due to architectural consequences or individual skill at circuit design [22]. They felt that a methodology for describing reconfigurable architecture and assessing performance would be of great value, especially if it subsumes the differences of fine-grained commercial devices and 'chunky' approaches. Unfortunately the latter was assessed as unlikely until more experience with reconfigurable machines is acquired.

Athanas and Silverman developed the PRISM (Processor Reconfiguration through Instruction Set Metamorphosis) as a more flexible alternative to special purpose machines [1]; this work was done as Athanas' Ph.D. work under Silverman. They noted that dramatic speedups can be had by implementing the most compute-bound portions of a program in hardware. They sought to replace dedicated hardware co-processor units with FPGAs and a high-level language interface.

They point out that communication bandwidth between the CPU and the co-processor is critical to the success of the technique. Toward this end they sought to improve bus access of the co-processor so that transfers would be less expensive. They do not, however, systematize the allocation of program parts to execution domains. In their model, execution occurs in two distinct modes—conventional style with opcodes in the CPU, and hardware implemented in the co-processor. Then they attempt to manage the bottlenecks between the two. They also point out that certain portions of programs give greater benefit when assigned to the co-processor. There is no attempt to select the portions of code that yield the most benefit by assignment; they depend instead on the programmer's knowledge of where the code spends the most time.

Athanas and Silverman felt that important directions for research included development of special purpose FPGAs that provide better support for architectural features. These include shadow configurations to support rapid switching between configurations, faster configuration down loads, and support for context-switching and resource sharing between time-shared tasks. This has merit, but certain critical deficiencies hamper the success of the work. They are:

Applications that need special purpose hardware are unlikely prospects for timesharing. If throughput cannot be adequately provided by general-purpose platforms, timesharing would be the first convenience to give up. Hence techniques to share execution assist hardware (co-processors) are not needed, at least within executing programs. (Sharing resources between runs, on the other hand, is a different story, and the whole reason for configurability.)

Applications that process steady streams of data will be slowed by switching the critical execution resource between competing portions of the code. As with competition between time-shared tasks, if the need for speed warrants special purpose hardware (even if reconfigurable), then that hardware should spend its entire time doing one particular thing. If the need permits switching the resource out, then fast hardware that has been optimized for sharing (i.e. a CPU) should be used.

There is no governing theory that allows coherent decisions to be made about the relative merit of configuring one portion of code versus a different portion in the high-speed assist unit.

Wirthlin and Hutchings are attempting to increase what they call the functional density of circuits implementing software [28]. They have examined the possible gains that would accrue to systems with improved reconfiguration times and characterized it against the length of the calculation. Not surprisingly, they conclude that the smaller the duration of the calculation, the more sensitive it is to configuration latency. They have also attempted to improve functional density by preparing specialized operators; e.g., multiplication by a constant would employ circuitry that does the specific multiplication rather than using a general multiplication circuit and a constant. This results in both smaller and faster circuits.

Maya Gokhale built the Splash, a reconfigurable processor used by many researchers; in [9] she details the architecture. It consists of a linear sequence of thirty-two FPGAs which function as configurable pipeline stages. The FPGAs, Xilinx 3090 chips, are programmed in VHDL. The whole assembly communicates with a host processor across a VME bus.

Gokhale reported a speedup of 330 over Cray-2 performance in spite of the fact that the Splash is severely I/O limited. She speculates that many applications could achieve an additional ten-fold speed-up if the I/O bottleneck were removed. There is no concept of hierarchy associated with Splash, and the only accommodation for the disparity in processor bus speed and Splash's processing rate is an eight megabyte staging memory.

While Splash is important as a research tool for configurable computing, the following criticisms are apply:

The lack of hierarchy means that there can be no accommodation of lower bandwidth input and output streams.

Routine programming in VHDL is tedious.

The logic packages are small (Xilinx 3090s) and the pin connectivity is still more limiting.

C. A. R. Hoare and his laboratory are working on configurable computing. In [13] he details his process for compiling high level code (in this case occam) to hardware. His emphasis is on generating correct translations by the use of 'correctness-preserving' transformations. The translation is based on a state machine which activates each operation sequentially. His example showed a small program that was efficiently translated to hardware. In practice, only small chunks of code could be configured because the HARP board he used accommodated only one FPGA.

Hwang in [17] explores a concept that he calls pipenets. This is a generalization on vector processing where arrays are streamed through a sequence of cascaded operations. The implementation that he proposed was a sequence of operators connected by cross-bar switches. Pipenets were limited to processing of arrays and had no hierarchy. No actual implementation was reported.

Yen and Wolf explored the problem of dividing an acyclic task graph between available processors which may be either one of several types of CPU or an ASIC. They iteratively explored the alternative configurations accounting for communication and processing time. They accounted for the cost of sharing communication and CPU resources, but did not allow for shared hardware of ASIC resources. Tasks were required to be completely resident on either a particular CPU or ASIC, as there was no treatment of hierarchical networks. There was no treatment of reconfiguration delays because ASIC resources were not shared.

Chiodo et al. proposed a uniform execution model for hardware and software hosted execution called Co-Design Finite State Machines (CFSM). Execution is carried out by communicating finite state machines which may reside in either hardware or software. C code could be used to generate either hardware or software, but there was no automatic partitioning [5].

Peng and Shin [25] use a least common multiple (LCM) approach to partitioning a task load among a set of processors. The idea is that scheduling is easier if the total load can be treated as a single non-repeating task. To that end, a super-task is created by replicating the task executions until they all end together. The length of the super-task is then the LCM of all of the task periods. For scheduling purposes, the super-task can be treated as if it were non-periodic because there are no side effects that propagate into the next super-cycle.

The LCM approach is hard to apply in practice for the following reasons:

The periods of most tasks are many hundreds or thousands of CPU cycles. If the task periods are relatively prime, the length of the planning cycle becomes prohibitive [29].

If the period is bounded but not constant (e.g. engine speed), the priority scheme must be validated for each possible period [29].

The events triggering separate tasks must be synchronized in order to retain validity of schedules derived.

Peng and Shin explored an interesting branch and bound algorithm to speed discovery of the best task partition and schedule. They allocate tasks to processors and note the system hazard (the task latency divided by the available latency). They get a lower bound on the ultimate system hazard by using the load imposed by allocated tasks and an approximation of the load that unallocated tasks will eventually impose. The approximation is not exact because it neglects the contention that unallocated tasks will cause each other, but it is a valid lower bound on that load. The lowest cost alternative is chosen for expansion until completely expanded configurations with all tasks allocated are reached. Because completely allocated configurations have exact costs, they enable pruning of unexpanded alternatives that have inferior cost bounds. When such a configuration has a cost lower than all other alternatives, it is optimal.

Peng and Shin correctly claim polynomial time complexity for the bounding and pruning operation, but this does not imply that the whole algorithm has polynomial time complexity. There is no argument that sufficient branches are pruned to guarantee that a polynomial bounded number of nodes will be investigated. Their experimental data indicate, however, that average performance is quite good.

Ptolemy [2] is a C++ system that relies on object oriented programming and class inheritance to provide a uniform programming interface for synthesizing hardware or conventional software on networked CPUs. While a powerful programming tool, the programmer decides what code should become hardware or software and on what machine it should run.

COSYMA was developed at the University of Baunschweig as a vehicle for experimenting with hardware and software partitioning algorithms [7]. Code is compiled from a C-related language called $C^\alpha$. The output of the compiler is an acyclic graph of basic blocks which are allocated to a single CPU or ASIC. Communication is via memory, the processor halting when control transfers to the ASIC. Allocation to hardware or software is determined by simulated annealing with a cost function based on instruction timing, communication overhead, and hardware performance. COSYMA has the following limitations [29]:

The architecture accommodates only one CPU and one ASIC.

Hardware and software components may not run concurrently.

The performance assessment algorithm used cannot handle periodic and concurrent tasks.

Simulation-based timing may not be accurate enough for hard timing constraints.

The simulated annealing cost function did not account for hardware costs.

Lehoczky and Sha researched the application of real-time scheduling techniques to bus communication between processors in a distributed system [20]. They did not extend their results to other resources such as distributed array access or contention for FPGAs by alternative configurations sharing the same hardware.

The embedded systems community is primarily concerned with partitioning software functionality between one or more CPUs and non-reconfigurable circuits fabricated as ASICs. Yen and Wolf typify this group, which includes Buck, Gupta, Ernst, and Chiodo. The configurable computing engine community also investigates problems associated with realizing software as circuits. Most of this research involved reconfiguration only as programs are loaded and thus bears strong similarity to the ASIC work in the embedded system community. Athanas, Gokhale, and Hoare typify this approach. The next level of reconfigurability is dynamic reconfiguration investigated by Hutchings in which the contents of the FPGA are switched during execution. There is no existing work which addresses hierarchical reconfiguration.

Yen and Wolf, Lehoczky et al., and Peng and Shin are concerned with guaranteed latency bounds. The only research that treats the real-time behavior of non-software objects is that of Lehoczky and Yen. Lehoczky treated inter-processor busses as a real-time resource that must be shared. Yen and Wolf are included because they treated ASICs as real-time objects, although these were not shared and consequently had trivial real-time behavior.

All of the work that dealt extensively with partitioning, if it mentioned program structure at all, stated that acyclic graphs are the format of program components that are manipulated. Acyclic graphs simplify the complexity of algorithms that manipulate data structures (this likely accounts for their widespread use: Yen and Wolf, Peng and Shin, Gupta et al., Ernst et al., Stone, and Bokhari). But such graphs limit the granularity of the program objects manipulated to high level modules.

Henkel and Ernst examined use of multiple heuristics for partitioning software between CPU execution and a co-processor [10]. This work was motivated by the observation that particular heuristic rules work well for certain granularity, but not others. The recognition of granularity is important because programs behave differently at different scales. There is no effort by Henkel and Ernst optimize placement of pieces designated for hardware execution.

Most projects (Athanas, Hutchings, Gokhale, Hoare, Buck, Gupta, Ernst, and Chiodo) did not address automatic partitioning, relying instead on the programmer to designate assignments of hardware to execution units. Of those who undertook automatic partitioning (Peng and Shin, Stone, and Bokhari) divided the work load up between CPUs. Of those who addressed partitions between hardware and software, Gupta and Ernst were limited by their approach to systems of one CPU and one ASIC. Only Yen and Wolf dealt with partitions among multiple CPUs and ASICs.

Existing research does not treat computing resources as hierarchical collections of reconfigurable objects. This treatment will not only systematize the generation of reconfigurable designs, but also unify the disparate ideas in conventional computing. Most of the existing techniques for analyzing programs for mapping into networks are only valid for acyclic graphs. A more general technique that deals with looping behavior is needed. In order to map programs into actual hardware, it will be necessary to account for the effects of competing accesses to shared objects. No existing work has generalized the real-time scheduling techniques to shared objects like arrays or common subroutines.

Our Prior Research

Our existing work [3] addresses the mapping of systolic software into networks of execution resources. The key idea is that both software and hardware can be organized in hierarchic domains based on bandwidth of communication. Hardware tends to be packaged in units that naturally reflect this. Signals on a chip are nearly always faster than signals going off-chip. Communication between chips on a board is usually faster than messages to other boards. But even when the boundaries between higher and lower bandwidth communication domains do not correspond to physical packaging, they are non-the-less real. Software also exhibits this characteristic in that some portions of the code will inherently communicate more frequently. Thus software also can be analyzed and hierarchical domain structure developed based on inherent communication frequencies. Good performance depends on mapping high bandwidth software domains into hardware domains that can support it.

This paper reports on the design of the Trebuchet, a pseudo-asynchronous micropipeline. It grows out of an earlier effort we called SMAL [4]. SMAL was a system, which, like the Trebuchet, was compiled from Java to hardware. The execution engine was basically a massive synchronously clocked pipeline network that became unwieldy with any but the smallest pieces of software.

A number of relevant articles exist. These are given below preceded by a reference number which is utilized to cite to a specific article throughout this application:

[1] Athanas, P. M., and Silverman, H. F., *Processor Reconfiguration Through Instruction-Set Metamorphosis*, Computer, Vol 26, pp 11–18, March 1993.

[2] Buck, J., Ha, S., Lee, E. A., and Messerschmitt, D. G. *Ptolemy: A Framework for Simulating and Prototyping Heterogeneous Systems*, International Journal of Computer Simulation, January 1994.

[3] Campbell, J. D. and Abbott, B. *Gear Train Theory: An Approach to the Assignment Problem Providing Tractable Solutions with Measured Optimality*, International Conference on Parallel and Distributed Processing Techniques and Applications, Vol II, pp 986–95, Jun. 30-Jul. 3, 1997.

[4] Campbell, J. D. *Experience with a Reconfigurable Java Machine*, International Conference on Parallel and Distributed Processing Techniques and Applications, pp 2459–66, Jun. 26–29, 2000.

[5] Chiodo, M., Guisto, P., Jurecska, A, Hsieh, H. C., Sangiovanni-Vincentelli, A., and Lavagno, L., *Hardware-Software Codesign of Embedded Systems*, IEEE MICRO, 14(4):26–36, August 1994

[6] Davis A., and Nowick S. M. *An Introduction to Asynchronous Circuit Design.* University of Utah Technical Report, UUCS-97-013, September 1997.

[7] Ernst, R., Henkel, J, and Benner, T. *Hardware-Software Co-Synthesis for Microcontrollers*, IEEE Design & Test of Computers, 10(4), December 1993

[8] Fleischmann, J. and Buchenrieder, K., *Prototyping Networked Embedded Systems,* Computer, Vol 32, No 2, pp 116–19, February 1999

[9] Gokhale, M., Holmes, W., Kopser, A., Lucas, S., Minnich, R., Sweely, D., and Lopresti, D. *Building and Using a Highly Parallel Programmable Logic Array,* IEEE Computer, January 1991, pp 81–89

[10] Hekel, J. and Ernst, R. *An Approach to Automated Hardware/Software Partitioning Using a Flexible Granularity that is Driven by High-Level Estimation Techniques*, IEEE Transactions on Very Large Scale Integration (VLSI) Systems, Vol. 9, No. 2, April 2001, pp 273, 289

[12] Hennessy, J. L., and Patterson, D. A., *Computer Architecture a Quantitative Approach*, Morgan Kaufmann Publishers, Inc., pp 371–380, 1990.

[13] Hoare, C. A. R., and Page, I. *Hardware and Software: The Closing Gap,* Transputer Communications, Vol 2, June 1994, pp 69–90

[14] http://oss.software.ibm.com/developerworks/opensource/jikes/

[15] http://www.jhdl.com/release-latest/docs/overview/intro.html

[16] Hutchings, B., and Wirthlin, M. J. *A Dynamic Instruction Set Computer,* Proceedings of the IEEE Symposium on FPGAs for Custom Computing Machines, pp 92–103, April 1995

[17] Hwang, K., and Xu, Z., *Multipipeline Networking for Compound Vector Processing*, IEEE Transactions on Computers, Vol 37, No. 1, January 1988, pp 33–47

[18] Johnson, K. T., Hurson, A. R., and Shirazi, B. *General Purpose Systolic Arrays,* IEEE Computer, November 1993, pp 20–31

[19] Kung, H. T. *Why Systolic Architectures?*, IEEE Computer, January 1982, pp 37–46

[20] Lehoczky and Sha, Performance *of Real-Time Bus Scheduling Algorithms*, ACM Performance Review, May 1986.

[21] Joseph Y.-T. Leung and Whitehead, J., *On the complexity of fixed-Priority Scheduling of Periodic, Real-Time Tasks*, Performance Evaluation, s:237–250, 1982

[22] Magione-Smith, W. H., *Seeking Solutions in Configurable Computing*, Computer, Vol 30, pp 38–43, December 1997.

[23] Meyer, J., and Downing, T., *Java Virtual Machine*, O'Reilly, 1997

[24] Narayanaswamy, P., *Dynamic Arithmetic-Logic Unit Cache*, Masters Thesis, Dept of Electrical Eng., Utah State University, 1999

[25] Peng and Shinn, *Optimal scheduling of cooperative tasks in a distributed system using an enumerative method*, IEEE Transactions on Software Engineering Vol. 19, March 1993, pp 253–67

[26] Stone, H. S. *Multiprocessor Scheduling with the Aid of Network Flow Algorithms,* IEEE Transactions on Software Engineering, Vol SE-3, No, 1, January 1977

[27] Sutherland, I. E., *Micropipelines*, Communications of the ACM, Vol 32, No 6, pp 720–738, 1995

[28] Wirthlin, M. J. and Hutchings, B. L., *Improving functional Density Through Run-Time Constant Propagation*, Field Programmable Gate Array Workshop, pp 86–92, 1997

[29] Yen, T., and Wolf, W., *Hardware-Software Co-Synthesis of Distributed Embedded Systems*, Kluwer Acedemic Publishers, 1996

[30] *Constraints Guide*, Xilinx, Inc., 2001

[31] *Development System Reference Guide*, Xilinx, Inc., 2001

Relevant prior patents include the following U.S. Pat. Nos. 5,834,957; 5,841,298; 6,044,457; 6,289,488; and 6,230,303.

DISCLOSURE OF INVENTION

The Trebuchet runs hardware compiled from software source code. In the present implementation, Java is the source code language of application programs to be run on the Trebuchet. We modified Jikes [14], an open source Java compiler originally from IBM, to include extra information we needed for the conversion to hardware. The output of Jikes is a standard Java class file. We obtain profile information from a modified JVM (Java_g, part of the Sun Java JDK). The profile also includes segmentation of the Java byte-codes into basic blocks and descriptors for the structure of for loops, if statements, etc.

There is considerable opportunity for fine grained parallelism. While parallelism is, in principal, possible to detect automatically, we added the keyword par to the syntax parsed by Jikes. Par signifies to the VHDL translator that a 'for' loop is vectorizable.

The Java byte-codes are translated to VHDL by analyzing the basic block contents. Stack and memory references become accesses to wires (thus being essentially compiled out) and successive op-codes become, for the most part, cascaded blocks of combinational logic. Array accesses become accesses to RAM. Since each array resides in its own RAM, concurrent access to different arrays is supported. Concurrent access to the same array must be arbitrated across the program.

We targeted our hardware at the Xilinx V800 FPGA. With capacity of 800,000 gates, there is room for moderate size software experiments. In the future we intend to generalize Trebuchet to address designs involving multiple chips so that programs of arbitrary size may be executed. Hardware configuration files are generated by standard Xilinx tools [31].

The most significant current aspects of the present patent application are, though, the loops discussed below and utilizing a system of finite state machines built with synchronous logic for controlling the flow of data through computational logic circuits programmed to accomplish a task specified by a user, having one finite state machine associated with each computational logic circuit, having each finite state machine accept data from either one or more predecessor finite state machines or from one or more sources outside the system and furnish data to one or more successor finite state machines or a recipient outside the system, excluding from consideration in determining a clock period for the system logic paths performing the task specified by the user, and providing a means for ensuring that each finite state machine allows sufficient time to elapse after the computational logic circuit associated with that finite state machine has obtained input data that all signals generated within such computational logic circuit in response to such input data have propagated through such computational logic circuit before communication is permitted to occur from such computational logic circuit to a subsequent computational logic circuit.

BRIEF DESCRIPTION OF DRAWINGS

FIG. 1 depicts a pipeline consisting of handshaking FSMs and computational logic. Each FSM exchanges signals with the prior and succeeding stages, and supplies a signal to the computational logic for latching input values. A software basic block is a sequence of instructions that contain no branching. A super block is a sequence of basic blocks, each of which may be conditionally executed. The particulars of the computational logic are derived from super blocks in the application to be executed.

FIG. 3 shows an example Java fragment translated to a Trebuchet stage. The computational logic is comprised of latches to capture the input values, wires conducting the value of the signal j into an adder, and the resulting signal k propagating to the next stage.

FIG. 4 shows the layout of a vectorized for-loop. A tight loop initiates successive waves of execution that propagate through the pipe. It is the execution of vectorized loops that lend the Trebuchet its performance advantage and pseudo-asynchronous attributes.

FIG. 5 illustrates the control of conditional elements. The signal representing the truth value of the test condition switches a multiplexor. Either the computed results or the input values propagate forward based on the selection made by the multiplexor.

MODES FOR CARRYING OUT THE INVENTION

Modifications to the Jikes Java Compiler

The Java code is compiled by a modified version of the Java compiler Jikes. We added keywords to the otherwise standard Java syntax recognized by Jikes. As noted above, in principle the compiler could have been modified to recognize parallelizable and systolizable loops (see [12]). At some point in the future, we intend to do this.

In addition to the par, we also included the keywords netstart, netend, and expose. Netstart and netend indicate respectively the beginning and end of the code to be analyzed for hardware mapping. Expose designates variables that are required as output from the execution engine. All of these represent expediencies that could, in principle, be automatically recognized by a compiler.

The structures which may be inserted into the Java class files include start tags, stop tags, and parallel loop descriptor tags. The latter designate 'for' loops for vectorization. The byte code interpreter has special code added to it to detect this extra information in the execution stream of the program. Because it is desirable that code thusly modified also be executable by conventional JVM platforms, the tags are structured so that a conventional JVM will simply jump around them.

Figure 2:
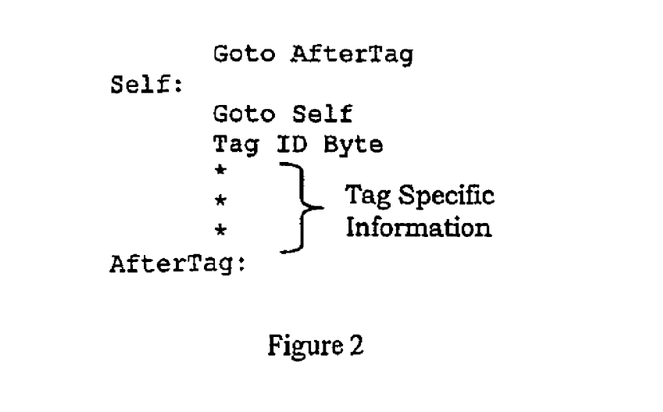
FIG. 2 depicts the structure of descriptor tags embedded in the Java byte-stream by the modified Jikes compiler. The compiler never generates a 'jump-to self' instruction. Thus a descriptor tag can be recognized in the byte-stream by a jump followed by a jump-to self. This allows Trebuchet code to execute correctly on conventional JVMs. Execution simply jumps over it.

We needed to format the tags so that they could be unambiguously recognized in the JVM execution stream. The compiler never generates a jump-to-self instruction, so tags are constructed as a jump followed by a jump-to-self, followed by tag specific information. See FIG. 2.

Modifications to the Java Virtual Machine

One of the purposes of the Trebuchet is to experiment with mapping of regions of software onto hardware regions. The theory of this mapping, published in [3], depends on profile information with the number of times communication arcs are utilized, rather than the number of times nodes are visited, as in a standard profile. Consequently the JVM was altered to collect transfer of control statistics. Java_g was tailored to output a file of bytecodes segmented into basic blocks (basic blocks are sequences of code which terminate at program jumps).

Bytecode Translation to VHDL

Trebuchet, written in Common Lisp, translates the basic block and profile information provided by the modified JVM. Trebuchet symbolically traverses each basic block, generating combinational logic corresponding to the sequence of instructions. Some instructions (e.g., multiplication) are impractical to configure as purely combinational logic and necessitate further segmentation. Trebuchet also constructs hierarchical components, such as 'for' loops, that consist of a controlling FSM (finite state machine) and other subcomponents.

Figure 3:
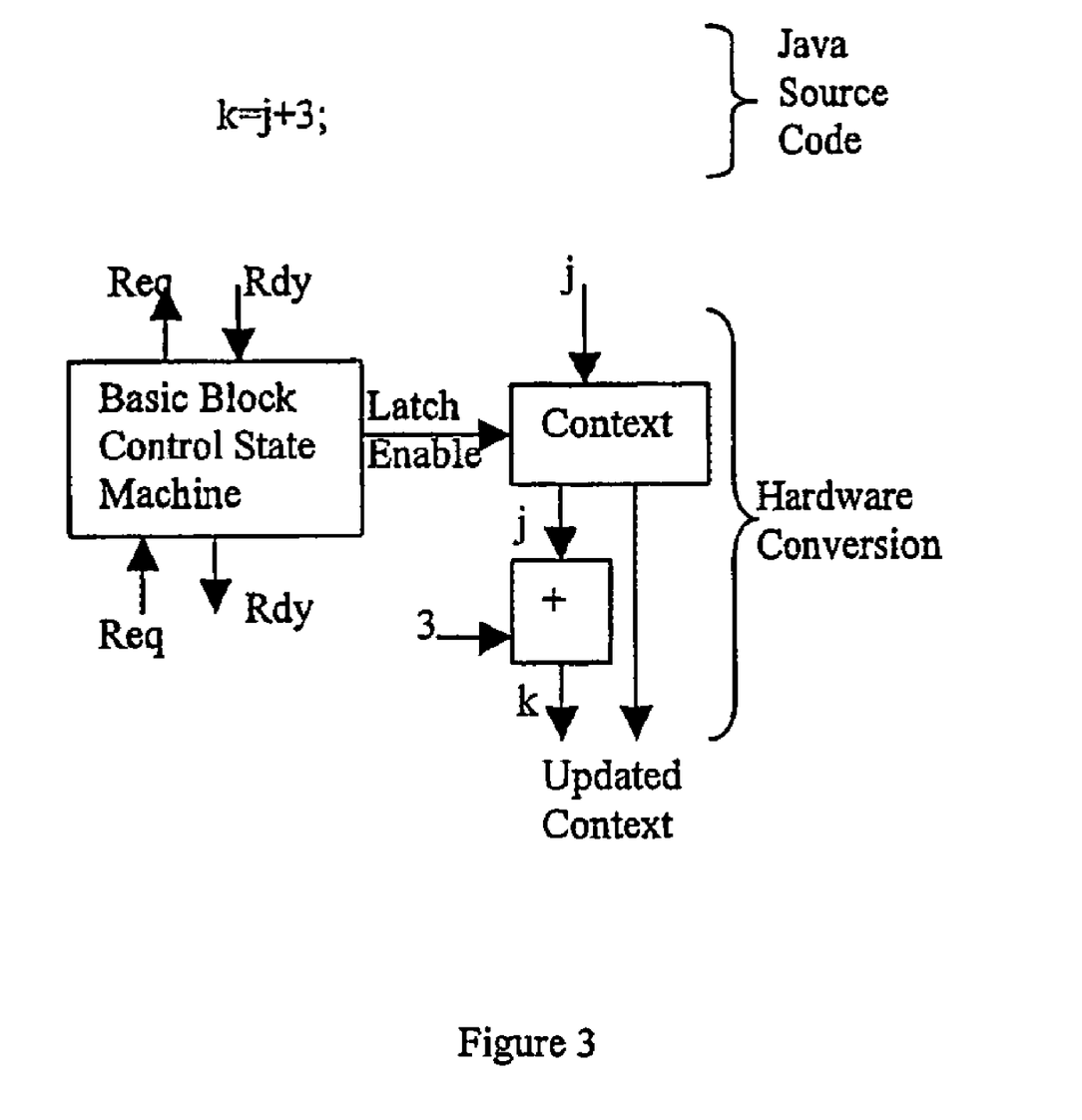

A basic block is a sequence of code unbroken by changes in sequential flow (except at the terminus). Thus there are not multiple paths of execution within a basic block. Trebuchet traverses a basic block, examining each instruction. Byte codes that manipulate memory (either stack or variable store) such as IPUSH rearrange the set of working wires. Operations that produce values (e.g., IADD) take their inputs from the set of working wires (deleting them from the set) and introduce new wires with the outputs. Trebuchet translates each basic block to a combinational net of logic. FIG. 3 shows an example basic block in source code and as hardware logic.

Many compilers manipulate stacks internally and map stack locations to registers. Pushing an object on the stack, while conceptually moving the entire stack, in reality only changes the association between register names and stack offsets. Trebuchet does this with the set of wires representing program memory and the stack.

Vectorized Loops

Because the algorithms we want to investigate with Trebuchet manipulate programs that stream data through operators, we needed a way to generate code that could execute systolicly. Java does not have a parallel operator, so we added one.

Figure 4:
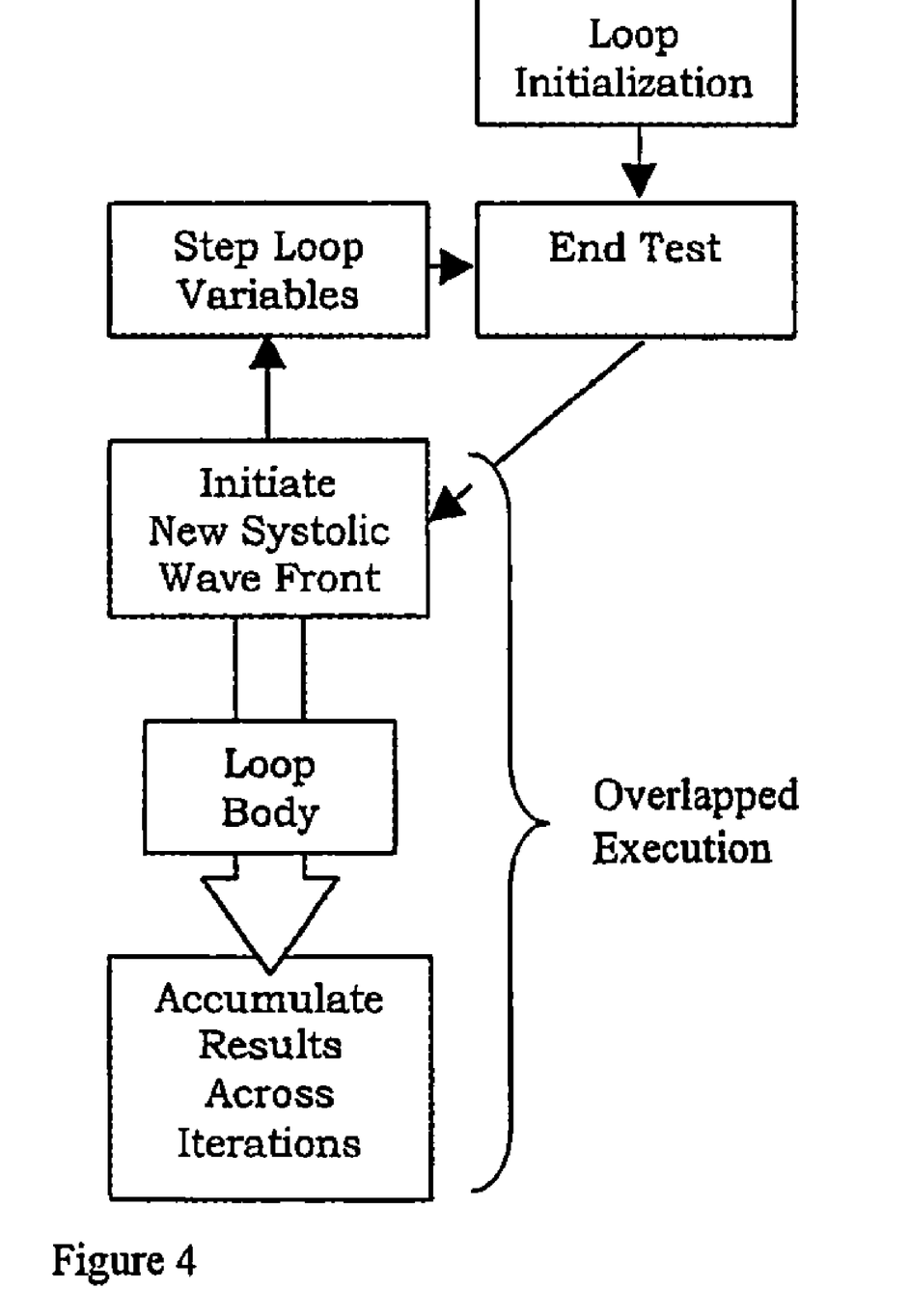

Conceptually, par for loops have four parts. These include the initialization_clause, the end_test, and the step_clause common to traditional for loops. The loop_body is run overlapped. As FIG. 4 shows, a par for loop is organized with a tight control loop that repetitively steps the loop variable, tests the termination condition, and initiates an entry into the pipelined loop body. All three of the control steps are executed in parallel to minimize the latency between subsequent pipeline entries. The pipeline initiation may be thought of as a thread that executes a particular loop iteration. This construction is not far removed from loop vectorization, a well studied topic in computer science [12] and could, in principle, have been accomplished automatically. But for our purposes, it is enough to use the par keyword to designate code that can be validly overlapped in execution.

Trebuchet generates a vectorized loop from the body of the Java 'for' loop and the control clauses specified with it. It rearranges the controls and forms a pipeline from the succession of basic blocks in the body of the loop. The test condition, the stepping of loop variables, and the first stage of the pipe are all initiated in parallel.

Each iteration depends on the 'current' loop variables, as does the end test. Since these are all executed in parallel, the initiation loop is unrolled to pre-compute the data. Additionally, each iteration propagating down the pipelined loop body carries forward a flag that signals the final iteration of the loop. The loop test, in Java, is intended as a condition for breaking out of the loop, and thus signals on completion of the final iteration.

The end condition must be propagated down the pipe because of the behavior of the last pipeline stage. The last stage consumes each thread until signaled that the last iteration has arrived. In this special case, it handshakes its results out to whatever follows the loop.

Since each iteration propagates an end test value corresponding to the next iteration, and the test itself depends on stepped variables, each cycle must pre-compute index variables that are two iterations ahead and a test value that is one iteration ahead. The control loop is unrolled to obtain these phase relationships. One consequence of this is that, lice old style FORTRAN do loops, par for loops must be guaranteed to execute once. Another restriction on valid par for loops is that step and test clauses not have side effects or access arrays.

Conditional Code

Figure 5:
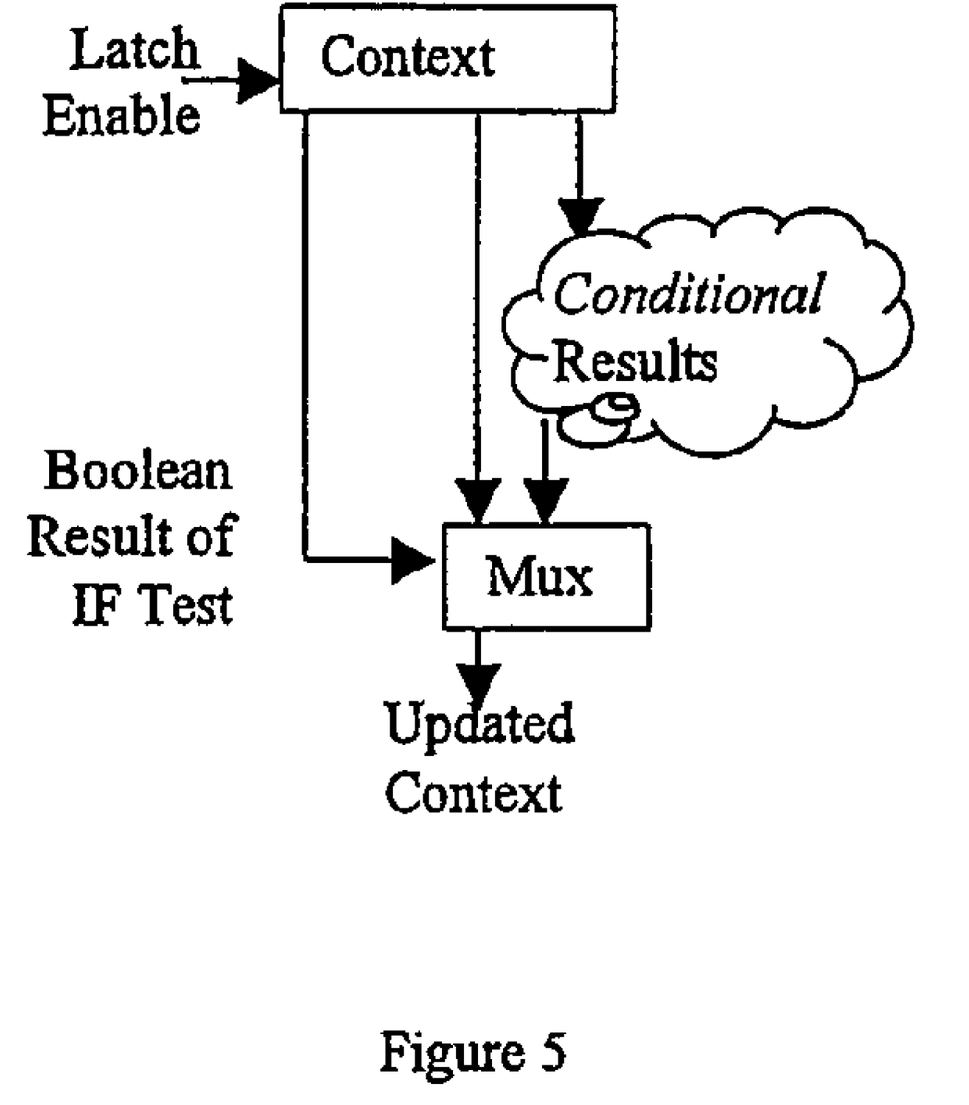

The Java compiler handles conditionally executed code by jumping around it. In vectorized code, successive executions (threads) must not be allowed to overtake and pass prior threads. Consequently, Trebuchet threads propagate from stage to stage, even where execution is suppressed. The boolean test result propagates through the range of the conditional execution. At each stage, it suppresses update of the values passed to the next stage by switching a multiplexer. FIG. 5 illustrates this operation. Similar measures have been taken by makers of vector processing units for conventional computers [12]. Note that even though pipeline threads must traverse stages for which execution is suppressed, such traversal is rapid because the controller FSM immediately transfers to output states without waiting for the logic to propagate through the computational logic.

Array References

Java arrays are dynamic in the sense that they may be created at any time, moved around as needed to optimize garbage collection, and reclaimed by the garbage collector when abandoned. We did not want to subject the hardware generated by Trebuchet to the performance penalties inherent in such manipulation, so we chose to map array creations to static arrays created in the FPGA at configuration time.

If, during the course of symbolic modeling of stack and variable store, a reference is made to a location identified with a particular array, the mechanism to access that array is constructed. If the array reference cannot be ascertained, the module is marked as not being compatible with realization as hardware, and must consequently execute from bytecodes by the JVM.

Pseudo-Asynchronous Execution

Trebuchet, when generating VHDL, calculates the length of the logic path for each pipeline stage and generates a FSM controller with enough wait states to allow signals to propagate. In order to decouple the clock period from this path, Trebuchet generates multi-cycle clock specifications for the Xilinx tools [30]. This allows the clock period to be driven by the exchange of handshaking signals rather than by the critical path through the combinational logic. This means that for lightly loaded conditions, the average stage delay dominates the pipe transit time, instead of the worst case stage delay. This is one of the advantages touted for the asynchronous micropipeline [27].

Another desirable trait of asynchronous circuitry is that, without a synchronizing clock, logic transitions are very well distributed in time. This minimizes current draw on the power supply and reduces the level of radiated EMI (electromagnetic interference) [6]. The tendency of synchronous logic is to have a well defined signature of successive gates transitioning (and drawing power). It is expected that heavy usage of multi-cycle logic paths will have the effect of smearing these signatures, thus obtaining some of the advantage of purely asynchronous circuitry.

Drawbacks of asynchronous circuits include sensitivity to signal noise, performance dependent on temperature and process variations, and incompatibility with conventional FPGA tools [6]. The Trebuchet avoids these difficulties by being, at heart, synchronous. It combines the best aspects of both worlds.

Preferably, the invention is machinery configured into a FPGA. The translator (compiler) should recognize vectorizable loops without explicit designation in the application source code. This avoids the necessity of designating in application source code those structures that may be pipelined.

Successive conditional blocks (code that may or may not be executed as controlled by an IF statement) should be cascaded as a single pipeline stage under the control of a single FSM. This lengthens the logic signal paths driven by clock signals, giving better overlapping. It also minimizes the number of FSMs, allowing limited on-chip resources to be used for computational circuitry instead of overhead necessary for constructing FSMs.

And a preferred system of finite state machines is built with synchronous logic, although asynchronous logic is acceptable, for controlling the flow of data through computational logic circuits programmed to accomplish a task specified by a user, having one finite state machine associated with each computational logic circuit, having each finite state machine accept data from either one or more predecessor finite state machines or from one or more sources outside the system and furnish data to one or more successor finite state machines or a recipient outside the system, excluding from consideration in determining a clock period for the system logic paths performing the task specified by the user, and providing a means for ensuring that each finite state machine allows sufficient time to elapse after the computational logic circuit associated with that finite state machine has obtained input data that all signals generated within such computational logic circuit in response to such input data have propagated through such computational logic circuit before communication is permitted to occur from such computational logic circuit to a subsequent computational logic circuit.

In one embodiment, an alternative to using wait states for ensuring that each finite state machine allows sufficient time to elapse after the computational logic circuit associated with that finite state machine has obtained input data that all signals generated within such computational logic circuit in response to such input data have propagated through such computational logic circuit before communication is permitted to occur from such computational logic circuit to a subsequent computational logic circuit is achieved by using a count-down timer wherein a register is set to a sufficient number of clock cycles for the computational logic circuitry to perform its task and decremented with each clock until reaching zero.

In another alternate embodiment, the option to using wait states for ensuring that each finite state machine allows sufficient time to elapse after the computational logic circuit associated with that finite state machine has obtained input data that all signals generated within such computational logic circuit in response to such input data have propagated through such computational logic circuit before communication is permitted to occur from such computational logic circuit to a subsequent computational logic circuit is achieved by using a count-up timer wherein a register is set to zero and increased with each clock until reaching a sufficient number of clock cycles for the computational logic circuitry to perform its task.

INDUSTRIAL APPLICABILITY

The way in which the System of Finite State Machines is capable of exploitation in industry and the way in which the System of Finite State Machines can be made and used are obvious from the description and the nature of the System of Finite State Machines.

We claim:

1. In a system of finite state machines built with synchronous logic for controlling the flow of data through computational logic circuits programmed to accomplish a task specified by a user, having one finite state machine associated with each computational logic circuit, having each finite state machine accept data from either one or more predecessor finite state machines or from one or more sources outside the system and furnish data to one or more successor finite state machines or a recipient outside the system, excluding from consideration in determining a clock period for the system logic paths performing the task specified by the user, and providing a means for ensuring that each finite state machine allows sufficient time to elapse after the computational logic circuit associated with that finite state machine has obtained input data that all signals generated within such computational logic circuit in response to such input data have propagated through such computational logic circuit before communication is permitted to occur from such computational logic circuit to a subsequent computational logic circuit.

2. The system as recited in claim 1, wherein:
the means for ensuring that each finite state machine allows sufficient time to elapse after the computational logic circuit associated with that finite state machine has obtained input data that all signals generated within such computational logic circuit in response to such input data have propagated through such computational logic circuit before communication is permitted to occur from such computational logic circuit to a subsequent computational logic circuit is a count-down timer wherein a register is set to a sufficient number of clock cycles for the computational logic circuitry to perform its task and decremented with each clock until reaching zero.

3. The system as recited in claim 1, wherein:
the means for ensuring that each finite state machine allows sufficient time to elapse after the computational logic circuit associated with that finite state machine has obtained input data that all signals generated within such computational logic circuit in response to such input data have propagated through such computational logic circuit before communication is permitted to occur from such computational logic circuit to a subsequent computational logic circuit is a count-up timer wherein a register is set to zero and increased with each clock until reaching a sufficient number of clock cycles for the computational logic circuitry to perform its task.

4. The system as recited in claim 1, wherein:

the means for ensuring that each finite state machine allows sufficient time to elapse after the computational logic circuit associated with that finite state machine has obtained input data that all signals generated within such computational logic circuit in response to such input data have propagated through such computational logic circuit before communication is permitted to occur from such computational logic circuit to a subsequent computational logic circuit is configuring each finite state machine with sufficient wait states for all signals generated within such computational logic circuit in response to such input data to propagate through such computational logic circuit before communication is permitted to occur from such computational logic circuit to a subsequent computational logic circuit.

5. In a system of finite state machines built with asynchronous logic for controlling the flow of data through computational logic circuits programmed to accomplish a task specified by a user, having one finite state machine associated with each computational logic circuit, having each finite state machine accept data from either one or more predecessor finite state machines or from one or more sources outside the system and furnish data to one or more successor finite state machines or a recipient outside the system, excluding from consideration in determining a clock period for the system logic paths performing the task specified by the user, and providing a means for ensuring that each finite state machine allows sufficient time to elapse after the computational logic circuit associated with that finite state machine has obtained input data that all signals generated within such computational logic circuit in response to such input data have propagated through such computational logic circuit before communication is permitted to occur from such computational logic circuit to a subsequent computational logic circuit.

* * * * *